(12) United States Patent
Summerlin

(10) Patent No.: US 6,494,652 B1
(45) Date of Patent: Dec. 17, 2002

(54) BLIND RIVET AND METHOD OF MAKING THE SAME

(75) Inventor: Frederick Arthur Summerlin, Bedfordshire (GB)

(73) Assignee: Milladale Limited et al., Bedfordshire (GB)

( * ) Notice: Subject to any disclaimer, the term of this patent is extended or adjusted under 35 U.S.C. 154(b) by 0 days.

(21) Appl. No.: 09/787,808

(22) PCT Filed: Sep. 8, 1999

(86) PCT No.: PCT/GB99/02979

§ 371 (c)(1),
(2), (4) Date: Jun. 18, 2001

(87) PCT Pub. No.: WO00/19114

PCT Pub. Date: Apr. 6, 2000

(30) Foreign Application Priority Data

Sep. 25, 1998 (GB) ............................................. 9820974

(51) Int. Cl.⁷ ........................... F16B 13/04; F16B 13/06
(52) U.S. Cl. .............................. 411/43; 411/38; 411/70; 470/31
(58) Field of Search ............................. 411/34, 36, 37, 411/38, 43, 69, 70; 470/29, 31

(56) References Cited

U.S. PATENT DOCUMENTS

| | | | |
|---|---|---|---|
| 4,639,174 A | * 1/1987 | Denham et al. | .......... 411/43 X |
| 4,846,611 A | 7/1989 | Shahriar et al. | |
| 4,958,971 A | * 9/1990 | Lacey et al. | .................. 411/38 |
| 5,645,383 A | * 7/1997 | Williams | .................. 411/43 X |
| 6,224,310 B1 | * 5/2001 | Summerlin et al. | ........ 411/43 X |

FOREIGN PATENT DOCUMENTS

| GB | 0 398 512 A | 11/1990 |
|---|---|---|
| WO | WO 98/23872 | 6/1998 |

* cited by examiner

Primary Examiner—Neill Wilson
(74) Attorney, Agent, or Firm—Miles & Stockbridge; Dennis P. Clarke

(57) ABSTRACT

Disclosed is a self plugging blind rivet for securing together apertured members, the rivet comprising a tubular shell having a tail end face at one end and a preformed radially enlarged bead at the other end, and a stem that extends through the shell and has a stem head adjacent the tail end face of the shell and a breakneck located away from the stem head, in which the region of the stem shank on the stem head side of the breakneck has a plurality of depressions formed therein extending to the breakneck, the corresponding region of the shell substantially filling the depressions in a region adjacent the stem head and progressively less towards the breakneck whereby, in use and under axial compression loading of the shell, the shell preferentially buckles in the region adjacent the member remote from the preformed head to form a blind head in contact with the member so as to clamp together the apertured members. Also disclosed is a method of assembling the above-described rivet comprising inserting the shell in a die, the first part of which closely fits the outside diameter of the shell, a second part being formed as a taper and which progressively increases in diameter until it intersects a third pan of the die into which the tail end of the shell protrudes, supporting the head of the shell with an abutment inserting a punch which has a first diameter closely fitting the bore of the rivet shell and a second diameter which closely fits the third pan of the die, applying a compressive force between the punch and the abutment so as to compress the rivet shell to fill both the taper and the larger diameter of the die, removing the abutment and punch, inserting a stem and ejecting the assembled shell and stem through the die, whereby, during ejection, the material of the shell is forced into the depression in the stem to substantially fill the depressions at least at the tall end of the shell and progressively towards the breakneck.

18 Claims, 4 Drawing Sheets

BLIND RIVET AND METHOD OF MAKING THE SAME

BACKGROUND OF THE INVENTION

Field of the Invention

The invention relates to a blind rivet. A blind rivet is one that can be inserted and set by access to one side only of aperture members to be riveted together.

BRIEF SUMMARY OF THE INVENTION

More particularly, the invention relates to a self plugging blind rivet comprising a tubular shell having a preformed radial head at one end, and a stem extending through the tubular shell and having a stem head adjacent the tail end of the shell. In use, the rivet is inserted, shell tail end first, through the apertures in the members to be riveted until the shell head contacts the nearer member and the shell tail protrudes beyond the further member. In order to set the rivet, the shell head is supported by an abutment and the stem is then pulled so that the stem head compresses the shell against the abutment and causes axial contraction of the shell and radial expression of at least part thereof to form a blind head which, together with preformed head, clamps the members together. At least part of the stem adjacent to its head is retained within the shell to plug the latter after the rivet has been set. The remainder of the stem (i.e. the tail end remoted from the head thereof) is preferably broken off to avoid protrusion from the shell head. This is generally effected by providing a breakneck at an appropriate position in the shank of the stem.

A rivet of this type is described in WO 98/23872 and features that are important in the performance of such a rivet are described in that application. The application also describes how a rivet can be constructed in which the portion of the river stem retained in the rivet after placing fully plugs the bore of the river and breaks flush with the head of the rivet under all working conditions of sheet thickness. To this end the pintail has reduced diameter relative to the stem shank and the breakneck is formed at the junction of the stem shank and the pintail.

In a first aspect the present invention provides a self plugging blind rivet for securing together apertured members, the rivet comprising a tubular shell having a tail end face at one end and a preformed radially enlarged head at the other end, and a stem that extends through the shell and has a stem head adjacent the tail end face of the shell and a breakneck located away from the stem head, in which the region of the stem shank on the stem head side of the breakneck has a plurality of depressions formed therein extending to the breakneck, the corresponding region of the shell substantially filling the depressions in a region adjacent the stem head and progressively less towards the breakneck whereby, in use and under axial compression loading of the shell, the shell preferentially buckles in the region adjacent the member remote from the preformed head to form a blind head in contact with said member so as to clamp together the apertured members.

The depressions are preferable axial grooves but may also be spiral or even annular. Especially where the depressions are axial or spiral, the stem shank and the shell may be provided with mutually-cooperating means to lock them together. Such means may comprise an annular groove formed around the stem shank, preferably immediately below the stem head, the groove containing shell material to retain the stem within the shell so that, before placing, the assembly of stem and shell is locked together and the part of the stem retained in the shell after placing is also locked to the shell. The groove may have an axial length of approximately one half of its diameter.

Preferably, the region of the stem shank having formed therein the depressions generally has a major diameter which is greater than the diameter of the region remote from the breakneck, whereby the end adjacent the breakneck comprises one or more radially-protruding shoulders which in use with a placing tool engage the nose of the placing tool so that the retained part of the stem breaks substantially flush with the rivet head throughout the working range of thickness of the members being riveted.

Preferably, the cross sectional area and strength of the stem in the region adjacent the stem head is substantially equal to that of the cylindrical part of the stem. The number of axial depressions may vary from a minimum of four depending on the method of manufacture. Preferably the distance across the mouth of the depressions is less than the circumferential width of the land areas between.

Preferably, the depressions are produced by a forming process so that material displaced from the depressions is contained in the lands between the depressions resulting in the increased diameter.

According to a further aspect of the invention a method is provided of assembling a rivet comprising a tubular rivet shell having a preformed radially enlarged heat at one end and a stem comprising a head and a shank which carries a breakneck remoted from the stem head, the region between the stem head and breakneck being formed with a plurality of depressions which extend to the breakneck, the method comprising inserting the shell in a die, a first part of which closely fits the outside diameter of the shell, a second part is formed as a taper and which progressively increases in diameter until it intersects a third part of the die into which the tail end of the shell protrudes, supporting the head of the shell with an abutment, inserting a punch which has a first diameter closely fitting the bore of the rivet shell and a second diameter which closely fits the third part of the die, applying a compressive force between the punch and the abutment so as to compress the rivet shell to fill both the taper and the larger diameter of the die, removing the abutment and punch, inserting a stem and ejecting the assembled shell and stem through the die whereby, during ejection, the material of the shell is forced into the depression in the stem to substantially fill the depressions at the tail end of the shell and progressively less towards the breakneck.

Preferably, the external diameter of the shell in the assembled rivet is equal to the diameter of the stem head. To this end the first die bore should have the same diameter as the stem head, although this may be difficult to arrange in practice. Consequently it is preferable that the stem head before assembly of the rivet is slightly larger than the first die bore so that, when the assembly is ejected, the stem head is sized to the diameter of the first die bore and hence to the diameter of the shell.

As an alternative to using a separate punch to form the rivet shell to the shape of the die, it is possible to approximate to this by using the stem in place of the punch to compress the shell against the abutment, thereby substantially filling the die, removing the abutment and ejecting the assembled stem and shell through the die.

Embodiments of the invention will now be described by way of example and with reference to the accompanying drawings, in which:

DETAILED DESCRIPTION OF THE INVENTION

Figure 1:
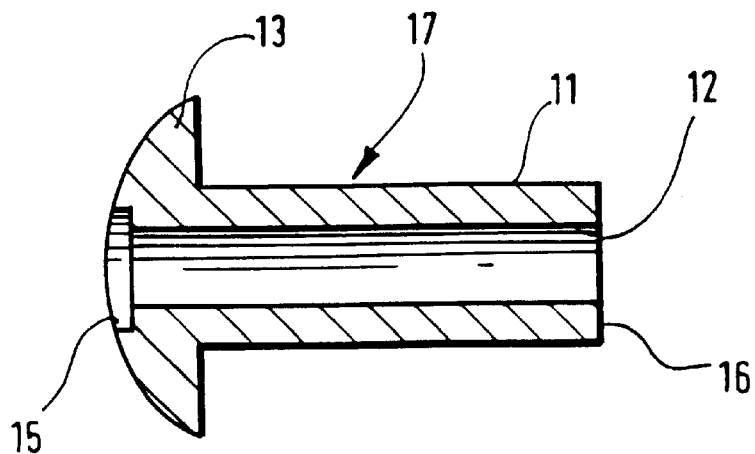
FIG. 1 is a longitudinal section through the shell of the rivet before assembly.

Referring first to FIG. 1, the shell 17 comprises a tubular body 11 having a concentric bore 12 and at one end a radially enlarged head 13 which carries a counterbore 15. The tail end 16 of the shell is flat and at right angles to the shell axis.

Figure 2:
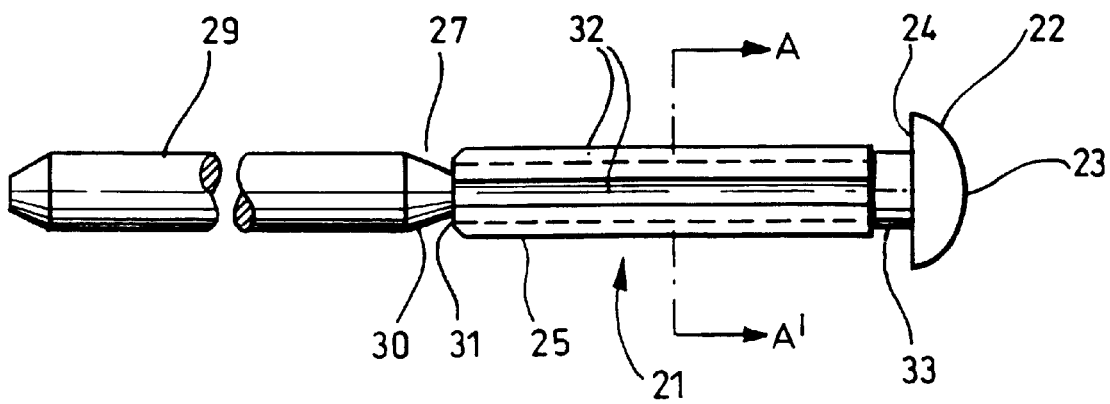
FIG. 2 is a side elevation of the stem of a rivet before assembly.
Figure 3:
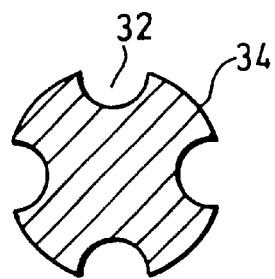
FIG. 3 is a section along the line A–A' of FIG. 2.

The stem 21 shown in FIG. 2 is elongate and generally cylindrical. At one end it has an integral radially enlarged head 22 which has convex face 23 directed away from the stem shank 25 and a substantially flat annular face 24 directed towards the stem shank. The diameter of the stem head is larger than the diameter of the body of the shell. Spaced away from the stem head is a groove 27 which constitutes a breakneck which determines the position at which the stem breaks when the rivet is placed. Breakneck 27 has a tapered force 30 directed towards the stem head and a face 31 normal to the stem axis directed towards the pintail 29. Between the breakneck 27 and the head of the stem 23 the stem carries axial depressions 32 which end a distance away from the stem head to produce a plain cylindrical portion 33 the length of which is approximately one half of the stem diameter and the diameter of which is substantially the same as the pintail 29. Depressions 32 are produced by a forming process so that the stem material from the depressions form lands 34 between the depressions as shown in FIG. 3 which is a cross section along the line A–A' of the stem of FIG. 2. Thus the cross sectional area of the stem in the region of the depressions and its strength is substantially unchanged. Lands 34 are arranged to lie on a circle the diameter of which is as close as possible to the bore of the rivet shell 12. Furthermore the dimension across the lands 34 is increased relative to those parts of the stem which do not carry depressions, viz the plain cylindrical portion 33 and the pintail 29. In this example the width of the mouth of the depressions is somewhat less than the width of the lands 34. Comparing this stem to that shown in FIG. 3 of WO 98/23872 it is evident that the stem of this application may be formed from a stem shank of uniform diameter whereas the stem in the previous application requires the pintail to be of a reduced diameter relative to the plain portion which can only be effected by extrusion of the pintail or some other additional operation during manufacture.

Figure 4:
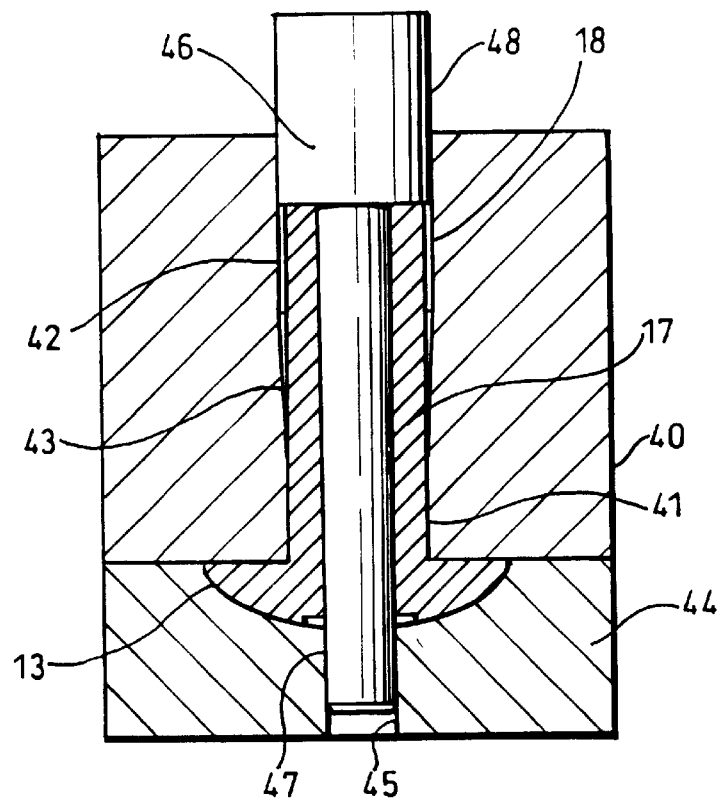
FIG. 4 is a section through a die containing a rivet body before commencing the first stage of the assembly process.

FIG. 4 shows a rivet shell 17 placed in a die 40. Die 40 has a small bore 41 which closely fits the outside diameter of the rivet shell and the tail of the rivet 18 protrudes into a larger bore 42. Bore 41 and bore 42 are joined by a tapered section of the die 43.

The head of the rivet 13 is supported by a member 44 which closely conforms to the rivet head and has a central bore 45. Punch 46 is inserted into large bore 42 so that the smaller diameter 47 of the punch enters the bore 12 of the rivet shell in which it is a close fit. The large diameter 48 of the punch enters the larger bore of the die 42 in which it is also a close fit.

Figure 5:
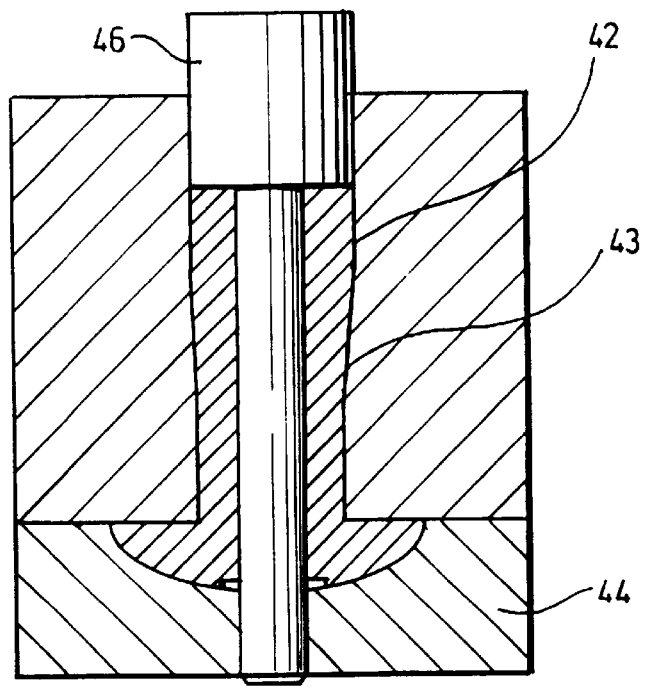
FIG. 5 is similar to FIG. 4 but shows the first stage of the assembly process completed.

FIG. 5 shows the completion of the first stage of the assembly. Punch 46 is urged towards the support member 44 and the body of the rivet is compressed so that it completely fills the large bore of the die 42 and the tapered portion 43.

Figure 6:
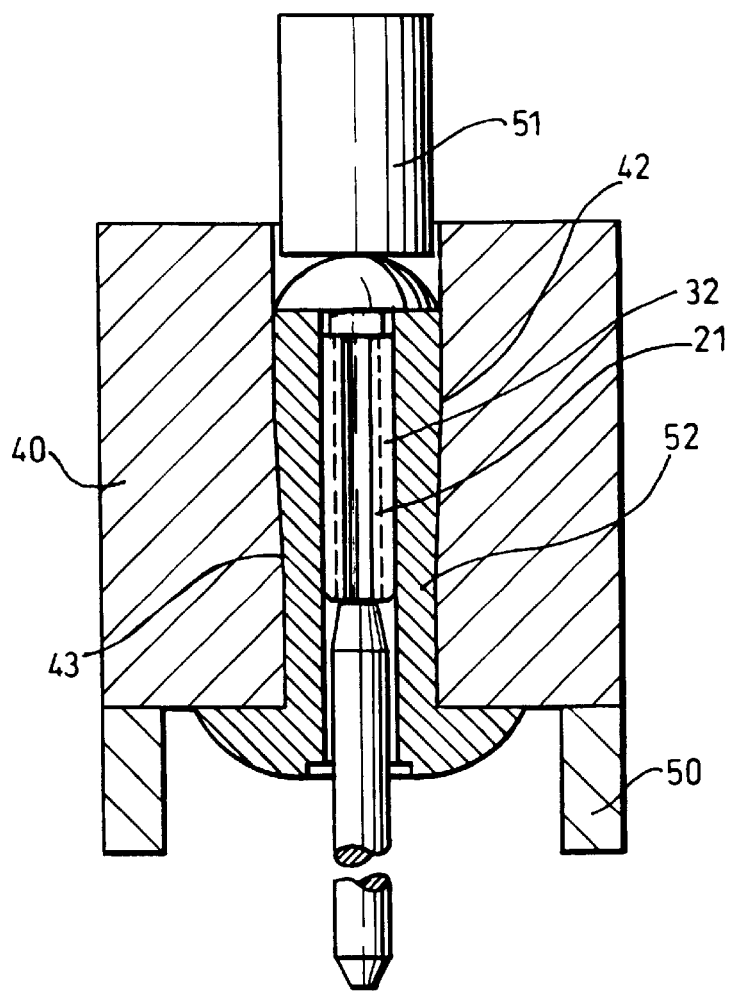
FIG. 6 is similar to FIG. 5 but shows the stem inserted in the rivet.

For the second state of the assembly, punch 46 is withdrawn, member 44 is retracted and die 40 together with the formed rivet shell 17 is moved to a second assembly station (FIG. 6). Here stem 21 is inserted. Die 40 is now supported by member 50. Compressive force is now applied via punch 51 which pushes rivet assembly 52 out of the die in the process swaging the tapered section 43 of the rivet into the recesses 32 of the stem which are progressively more filled as the diameter of the taper decreases, substantially full filling occurring at the narrow end of the taper 43.

Figure 7:
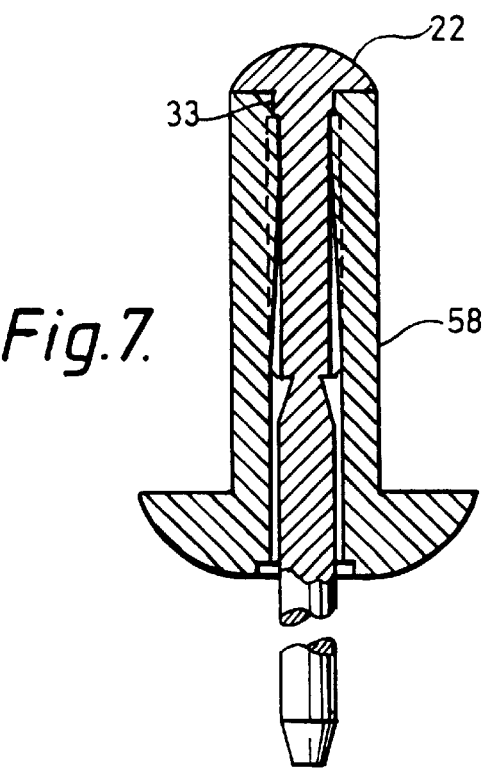
FIG. 7 shows the assembly process completed and the assembled rivet ejected from the die.

This is shown in FIG. 7. Additionally, the stem head 22 is sized to the exact diameter 58 of the completed assembly. The progressive increase in cross section of the rivet shell results in a corresponding increase in shell stiffness so that when the rivet is placed the tail of the rivet always forms adjacent the members being riveted. This effect is enhanced by the increased work hardening towards the tail of the rivet. FIG. 7 also shows how the plain cylinder portion of the stem 33 which forms a recess between the stem head 22 and the increased diameter of the lands 34 is filled with shell material and locks stem and shell together.

Figure 8:
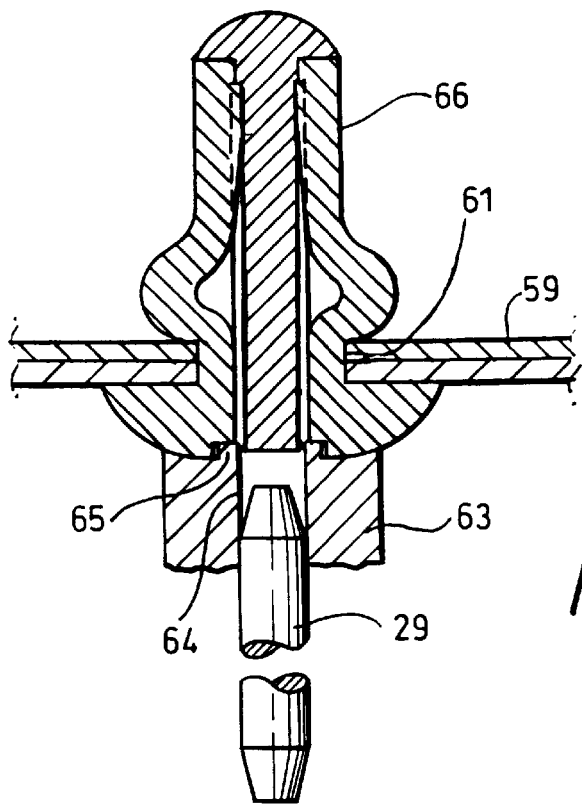
FIGS. 8 and 9 show sections of the rivet placed in sheets of minimum and maximum thickness respectively.
Figure 9:
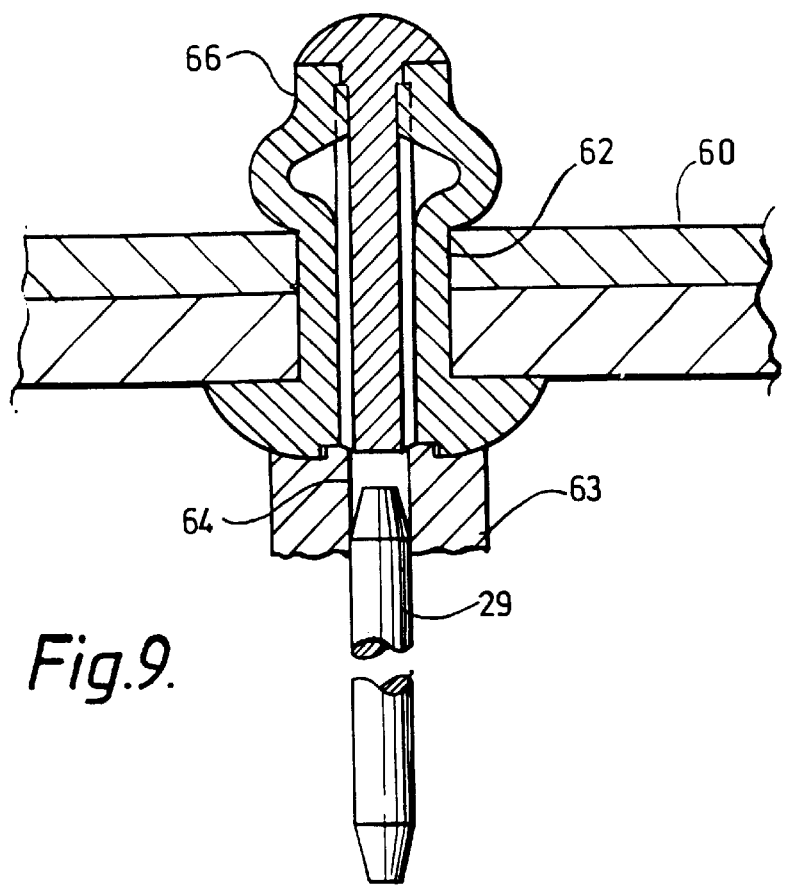

FIG. 8 shows a rivet set in minimum thickness sheets and FIG. 9 in maximum thickness sheets numbered 59 and 60 respectively. Rivets are inserted in respective holes 61 and 62 and set with a suitable pulling tool which has an annular anvil 63 which abuts the head and gripping jaws that grip the protruding part of the rivet stem 29. Operating the setting tool retracts the jaws relative to the anvil. Such setting tools are well known in the art of blind riveting. The bore 64 of the anvil 63 is a close fit on the pintail 29 and the part of the stem carrying the axial depressions has a sufficient diameter that it cannot pass through the bore of the anvil. Thus during placing the stem always breaks at the anvil. Anvil 63 carries a boss 65 of a diameter slightly less than the counterbore 15 in the rivet head. The stem therefore breaks when it contacts the boss ensuring the break point is always below the rivet head surface. FIGS. 8 and 9 also show how due to the progressive increase in rivet section towards the tail of the rivet the bulb always forms adjacent to the back sheet. Furthermore since the stem is pulled by the same distance before breaking irrespective of sheet thickness the tail shape changes by a minimal amount. Also the tail 66 of the placed rivet is virtually undeformed and hence stem and shell remain locked together.

What is claimed is:

1. A self plugging blind rivet for securing together apertured members, the rivet comprising a tubular shell having a tall end face at one end and a preformed radially enlarged head at the other end, and a stem that extends through the shell and has a stem head adjacent the tail end face of the shell and a breakneck located away from the stem head, in which the region of the stem shank on the stem head side of the breakneck has a plurality of depressions formed therein extending to the breakneck, the corresponding region of the shell substantially filling the depressions in a region adjacent the stem head and progressively less towards the breakneck whereby, in use and under axial compression loading of the shell, the shell preferentially buckles in the region adjacent the member remote from the preformed head to form a blind head in contact with said member so as to clamp together the apertured member.

2. A blind rivet according to claim 1, in which the rivet shell has a hardness gradient from the tail to the head, the tail being harder than the head.

3. A blind rivet according to claim 1, in which the region of the stem shank having depressions formed therein is generally of increased diameter relative to the region remote from the breakneck, whereby the end adjacent the breakneck comprises one or more radially-protruding shoulders which in use with a placing tool engage the nose of the placing tool so that the retained part of the stem breaks substantially flush with the rivet head throughout the working range of the thickness of the members being riveted.

4. A blind rivet according to claim 1, in which the depressions are axial grooves.

5. A blind rivet according to claim 1, in which the depressions are spiral.

6. A blind rivet according to claim 1, in which the stem shank and the shell are provided with mutually-cooperating means to lock them together.

7. A blind rivet according to claim 6 in which the mutually-cooperating means comprises an annular groove.

8. A blind rivet according to claim 7, in which the groove is formed around the stem shank.

9. A blind rivet according to claim 7, in which the annular groove is immediately below the stem head.

10. A blind rivet according to claim 7, in which the groove contains shell material to retain the stem within the shell.

11. A blind rivet according to claim 7, in which the groove has an axial length of approximately one half of its diameter.

12. A blind rivet according to claim 1, in which the cross sectional area and strength of the stem in the region adjacent the stem head is substantially equal to that of the cylindrical part of the stem.

13. A blind rivet according to claim 1, in which the stem shank comprises at least four depressions.

14. A blind rivet according to claim 1, in which the distance across the mouth of the depression is less than the circumferential width of the land areas between.

15. A blind rivet according to claim 1, in which the depressions are formed such that material displaced from the depression is contained in the lands between the depressions.

16. A blind rivet according to claim 1, in which the external diameter of the shell in the assembled rivet is equal to the diameter of the stem head.

17. A method of assembling a rivet comprising a tubular rivet shank having a preformed radially enlarged heat at one end and a stem comprising a head and a shank which carries a breakneck remote from the stem head, the region between the stem head and the breakneck being formed with a plurality of depressions which extend to the breakneck, the method comprising inserting the shell in a die, the first part of which closely fits the outside diameter of the shell, a second part is formed as a taper and which progressively increases in diameter until it intersects a third part of the die into which the tail end of the shell protrudes, supporting the head of the shell with an abutment, inserting a punch which has first diameter closely fitting the bore of the rivet shell and a second diameter which closely fits the third part of the die, applying a compressive force between the punch and the abutment so as to compress the rivet shell to fill both the taper and the large diameter of the die, removing the abutment and punch, inserting a stem and ejecting the assembled shell and stem through the die, whereby, during ejection, the material of the shell is forced into the depressions in the stem to substantially fill the depressions at least at the tail end of the shell and progressively less towards the breakneck.

18. A method of assembly of a rivet according to claim 17, in which the ejection process results in a hardness gradient in the shell shank between the tail and head ends, the tail end being harder than the head end.

* * * * *